United States Patent
Higai et al.

(10) Patent No.: US 9,669,444 B2
(45) Date of Patent: Jun. 6, 2017

(54) METHOD OF MANUFACTURING CURVILINEAL CLOSED STRUCTURE PARTS WITHOUT FLANGE AND APPARATUS FOR THE SAME

(75) Inventors: Kazuhiko Higai, Tokyo (JP); Yuji Yamasaki, Tokyo (JP); Toyohisa Shinmiya, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/394,191

(22) PCT Filed: Apr. 13, 2012

(86) PCT No.: PCT/JP2012/060644
§ 371 (c)(1),
(2), (4) Date: Nov. 21, 2014

(87) PCT Pub. No.: WO2013/153683
PCT Pub. Date: Oct. 17, 2013

(65) Prior Publication Data
US 2015/0076215 A1 Mar. 19, 2015

(51) Int. Cl.
| B23K 37/00 | (2006.01) |
| B23K 37/02 | (2006.01) |
| B23K 37/04 | (2006.01) |
| B23K 28/00 | (2006.01) |
| B21D 22/02 | (2006.01) |

(Continued)

(52) U.S. Cl.
CPC ........ *B21D 22/025* (2013.01); *B21C 37/0803* (2013.01); *B21C 37/14* (2013.01); *B21C 37/155* (2013.01); *B21C 37/16* (2013.01); *B21D 5/086* (2013.01); *B21D 47/01* (2013.01);

(Continued)

(58) Field of Classification Search
CPC ..... B21C 37/0803; B21D 11/20; B21D 51/06; B21D 22/30
See application file for complete search history.

(56) References Cited

U.S. PATENT DOCUMENTS

| 2009/0255310 A1* | 10/2009 | Heinz et al. ............... 72/173 |
| 2010/0088882 A1 | 4/2010 | Tomizawa et al. |
| 2012/0204993 A1 | 8/2012 | Higai et al. |

FOREIGN PATENT DOCUMENTS

| JP | 54-81156 | 6/1979 |
| JP | 2007-30023 | 2/2007 |

(Continued)

OTHER PUBLICATIONS

Supplementary European Search Report dated Oct. 7, 2015 from corresponding European Patent Application No. 12874346.5.

*Primary Examiner* — Erin Saad
(74) *Attorney, Agent, or Firm* — DLA Piper LLP (US)

(57) ABSTRACT

A method and apparatus manufactures a closed structure part without flange having a curvature and welded edges along a longitudinal direction of the part and further having a varying cross-sectional shape, from two metal plates. Each of two metal plates provided with a curvature along the longitudinal direction of the plate and provided with both ends in a width direction of the plate, are press-formed such that a folding line is formed at positions corresponding to a non-welded bent edge in a cross section of the part, and stacked on each other vertically such that their bulging sides face outward. Their left ends and right ends in the width direction are mutually welded along the longitudinal direction to form welded edges.

6 Claims, 5 Drawing Sheets

(51) Int. Cl.
  *B21C 37/08* (2006.01)
  *B21C 37/15* (2006.01)
  *B23K 31/02* (2006.01)
  *B21C 37/14* (2006.01)
  *B21C 37/16* (2006.01)
  *B21D 5/08* (2006.01)
  *B21D 47/01* (2006.01)
  *B21D 11/08* (2006.01)
  *B21D 11/14* (2006.01)

(52) U.S. Cl.
  CPC .............. *B23K 31/02* (2013.01); *B21D 11/08* (2013.01); *B21D 11/14* (2013.01)

(56) References Cited

FOREIGN PATENT DOCUMENTS

| | | |
|---|---|---|
| JP | 2008-120227 | 5/2008 |
| JP | 2009-19229 | 1/2009 |
| WO | 2008/123505 | 10/2008 |
| WO | 2011/034203 | 3/2011 |

\* cited by examiner

FIG. 5
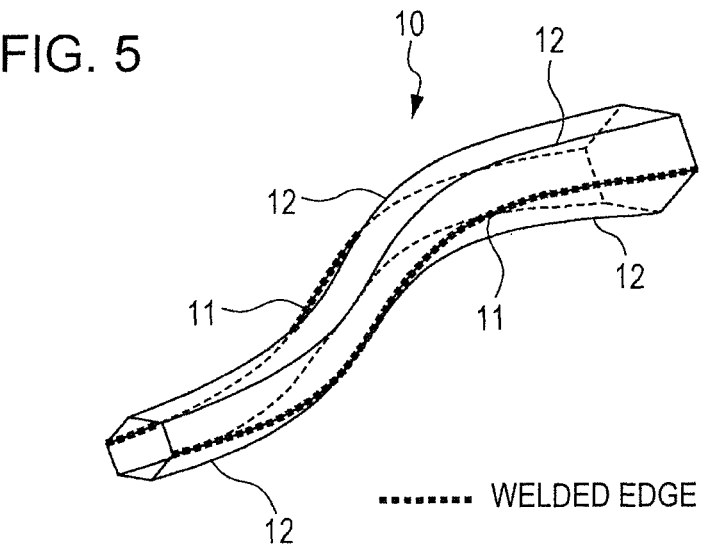
·········· WELDED EDGE
FIG. 6   HEXAGONAL SECTION
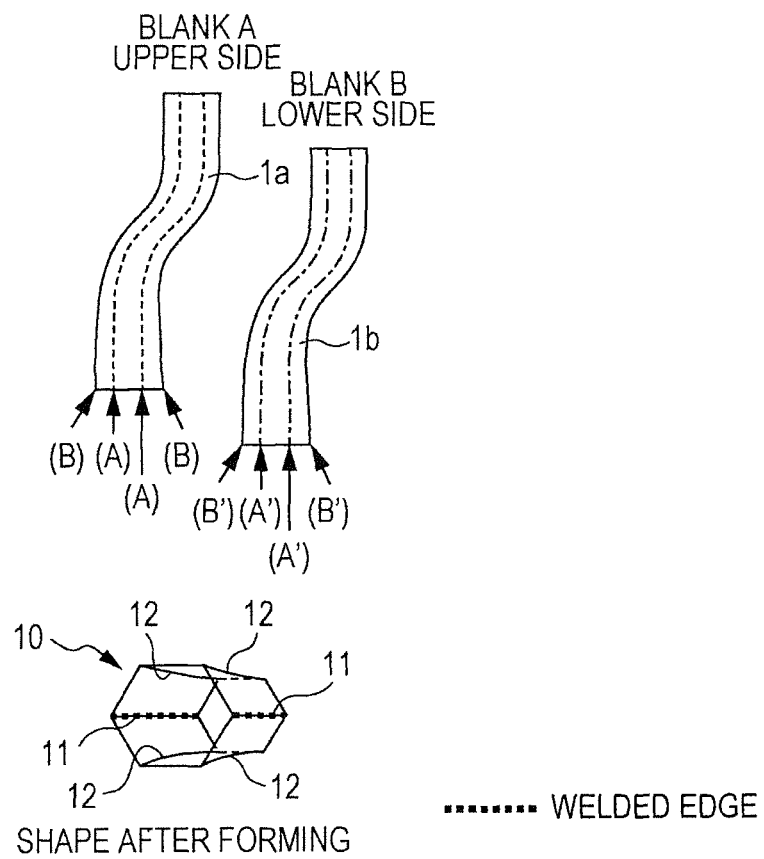
SHAPE AFTER FORMING
·········· WELDED EDGE

METHOD OF MANUFACTURING CURVILINEAL CLOSED STRUCTURE PARTS WITHOUT FLANGE AND APPARATUS FOR THE SAME

TECHNICAL FIELD

This disclosure relates to a method of manufacturing curvilineal closed structure parts without a flange and an apparatus for the same. More specifically, the disclosure relates to a method of manufacturing curvilineal closed structure parts without a flange and an apparatus for the same that can advantageously give a part, which has been manufactured by joining two separately-formed bodies to form a closed cross-section in automobiles, home appliances, and other fields, a curvilineal shape and a cross-sectional shape that varies over the entire length of the part for the purpose of weight reduction and improvement of collision characteristic and rigidity performance.

BACKGROUND

Japanese Unexamined Patent Application Publication No. 2008-120227 describes a technique of manufacturing a bumper reinforcement as a vehicular shock absorber that includes manufacturing a formed body having a constant cross-sectional shape by roll forming a high-tensile steel plate, then high-frequency hardening the formed body, and bending (sweep forming) into an arc shape such that it has a certain curvature in the longitudinal direction (the direction perpendicular to the cross-section) thereof.

Japanese Unexamined Patent Application Publication No. 2007-30023 describes a roll forming apparatus including a pair of rotary rolls disposed to sandwich a conveying path of a metal thin plate, and a rotary roll disposed thereunder, in which the distance between the pair of rotary rolls is variable, and the rotary roll disposed thereunder is movable up and down, and as a method of manufacturing a part using the apparatus, a technique of manufacturing a roll-formed part not having the same cross-section with respect to the longitudinal direction, in which when a part of a long metal thin plate is being conveyed between the pair of rotary rolls, the distance between the pair of rotary rolls is changed, and the rotary roll installed thereunder is moved up and down such that the metal thin plate being conveyed is locally deformed.

In the technique of Japanese Unexamined Patent Application Publication No. 2008-120227, a curvilineal closed cross-section part is manufactured by forming a closed cross-section part having a constant cross-sectional shape by a conventional roll forming, then high-frequency hardening, and giving a curvature with three benders. However, a part whose cross-sectional shape in the longitudinal direction of the part is not constant cannot be formed. Providing a curvature is limited to two-dimensional directions.

The technique of Japanese Unexamined Patent Application Publication No. 2007-30023 is a forming technique capable of varying the cross-sectional shape in the longitudinal direction of the part using a forming apparatus including, in addition to a conventional roll forming having a pair of rotary rolls, a rotary roll to vary the cross-sectional shape in the longitudinal direction of the part located under the pair of rotary rolls. However, it is impossible to simultaneously provide a curvature in the longitudinal direction.

As described above, in the conventional techniques, it is impossible to simultaneously perform varying of cross-sectional shape in which a cross-sectional shape (specifically, the cross-sectional shape in a direction perpendicular to the longitudinal direction of the part, that is, in the width direction of the part) is varied in the longitudinal direction of a part, and giving of a three-dimensional shape in which a curvature in the longitudinal direction of the part (or, in addition thereto, a twist). Therefore, varying of a cross-sectional shape and giving of a three-dimensional shape to a part need to be performed as separate forming processes, and the cost is thereby increased. Further, when a high strength steel plate is used as a material for the purpose of weight reduction, a forming defect is likely to generate during the bending after the varying of cross-sectional shape of the part.

SUMMARY

We discovered a means capable of manufacturing a closed structure part without a flange that has a curvature along the longitudinal direction of the part and a varying cross-sectional shape, from two metal plates, using a forming process in which varying the cross-sectional shape of the part and providing a three-dimensional shape are simultaneously performed.

That is, we provide:

(1) A method for manufacturing a closed structure part without flange having a curvature and welded edges along a longitudinal direction of the part and further having a varying cross-sectional shape, from two metal plates, the method comprising:

a first step of press forming each of the two metal plates, which is provided with a curvature along a longitudinal direction of the plate corresponding to the curvature of the part along the longitudinal direction and further provided with both ends in a width direction of the plate corresponding to the welded edges of the part, such that a folding line is formed at a position corresponding to a non-welded bent edge in the cross section of the part;

a second step of forming a closed structure by stacking the two metal plates after the press forming on each other vertically such that their bulging sides face outwardly and mutually welding their left ends and right ends in the width direction along the longitudinal direction so as to form welded edges; and a third step of forming obtained closed structure into the part having a target shape by guiding and conveying the obtained closed structure with a pair of left and right rotary rolls or, in addition thereto, a rotary roll thereunder while changing a distance between the left and right rotary rolls or, in addition thereto, moving the rotary roll up and down such that the obtained closed structure has a three-dimensional shape by using the folding lines and the welded edges as origins.

(2) An apparatus to manufacture a closed structure part without flange having a curvature and welded edges along a longitudinal direction of the part and having a varying cross-sectional shape, from two metal plates, the apparatus comprising:

a press forming machine that press forms each of the two metal plates, which is provided with a curvature along a longitudinal direction of the plate corresponding to the curvature of the part along the longitudinal direction and further provided with both ends in a width direction of the plate corresponding to the welded edges of the part, such that a folding line is formed at a position corresponding to a non-welded bent edge in the cross section of the part;

a welding machine that forms a closed structure by stacking the two metal plates after the press forming on each other vertically such that their bulging sides face outwardly and mutually welding their left ends and right ends in the width direction along the longitudinal direction so as to form welded edges; and a roll forming machine that forms obtained closed structure into the part having a target shape by guiding and conveying the obtained closed structure with a pair of left and right rotary rolls or, in addition thereto, a rotary roll thereunder while changing the distance between the left and right rotary rolls or, in addition thereto, moving the rotary roll up and down such that the obtained closed structure has a three-dimensional shape by using the folding lines and the welded edges as origins.

It is possible to give curvatures in the longitudinal direction of the part and in a direction perpendicular thereto, or a three-dimensional shape, in a single forming while varying the cross-sectional shape. Because of the effect of simplification of manufacturing process due to a reduction in number of dies and a reduction in assembling steps, the cost can be significantly reduced.

In addition, since a predetermined shape can be formed mainly by bending, manufacturing of a part using an ultra-high tensile strength steel plate as a material is facilitated, and the weight can be further reduced by eliminating flange.

BRIEF DESCRIPTION OF THE DRAWINGS

FIG. 5 is a schematic perspective view showing an example of a target shape of a part having a hexagonal cross-section.

FIG. 6 is a schematic diagram showing a manufacturing procedure of a part having a hexagonal cross-section.

Figure 1:
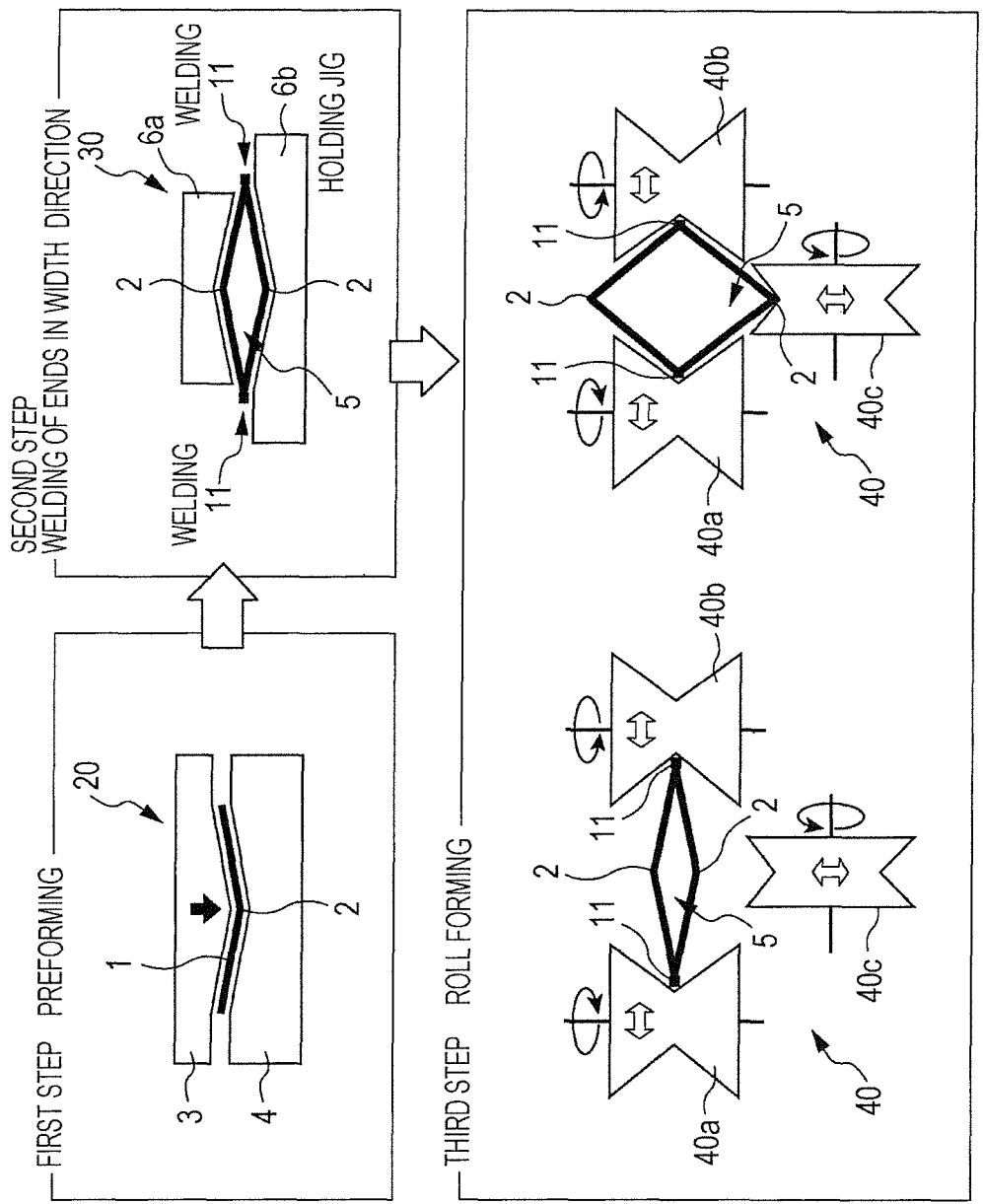
FIG. 1 is an explanatory diagram of our manufacturing process.

REFERENCE SIGNS LIST 1 metal plate (a and b are one of two plates and the other, also referred to as blank)
2 folding line (corresponding to bending lines (A) (A'))
3 punch
4 die
5 closed structure
6 holding jig (a and b are upper one and lower one)
10 part (curvilineal closed structure part without flange that is the object of manufacture in the present invention)
11 welded part
12 non-welded bent part
15 intermediate shaped part of comparative example
16 final shaped part of comparative example
20 press forming machine
30 welding machine
40 roll forming machine
40a, 40b rotary roll
40c rotary roll

DETAILED DESCRIPTION

Figure 2:
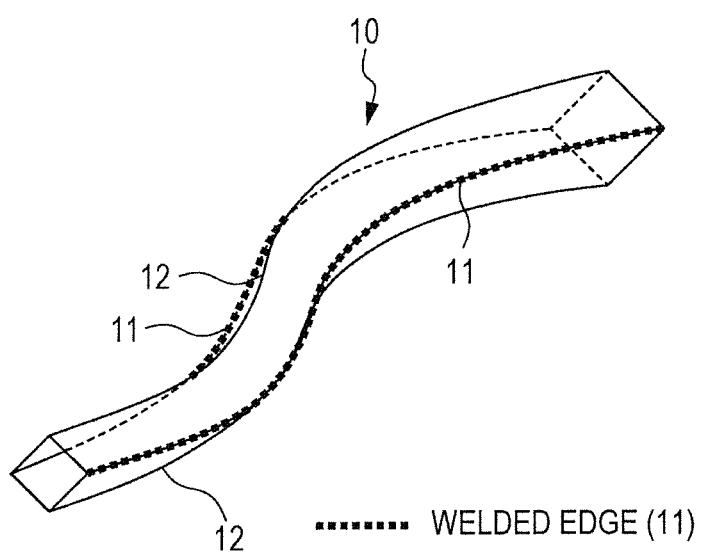
FIG. 2 is a schematic perspective view showing an example of a target shape of a part.

FIG. 2 is a schematic perspective view showing an example of a part that is the object of manufacture (curvilineal closed structure part without a flange) 10.

The example of FIG. 2 has a cross-sectional shape (a cross sectional shape in the width direction, the same shall apply hereinafter) that is quadrangle, and has a curvature along the longitudinal direction. The beginning end and the terminal end in the longitudinal direction are different in cross-sectional shapes (that is, the shape is varied). The length of each side of the quadrangular cross section at the beginning end is 30 mm, the length of each side at the terminal end is 20 mm, the total length in the longitudinal direction (the shortest distance between both ends along the longitudinal direction) is 300 mm, the radius of curvature is 400 mm on the beginning end side and 400 mm on the terminal end side, and the direction of curvature is reversed in the left-right direction at the middle in the longitudinal direction of the part (at a position of 150 mm in the longitudinal direction from either end). Of the two pairs of vertices at diagonal positions of the quadrangle, one pair form welded edges 11, and the other pair form non-welded bent edges 12. There are no flanges.

Figure 3:
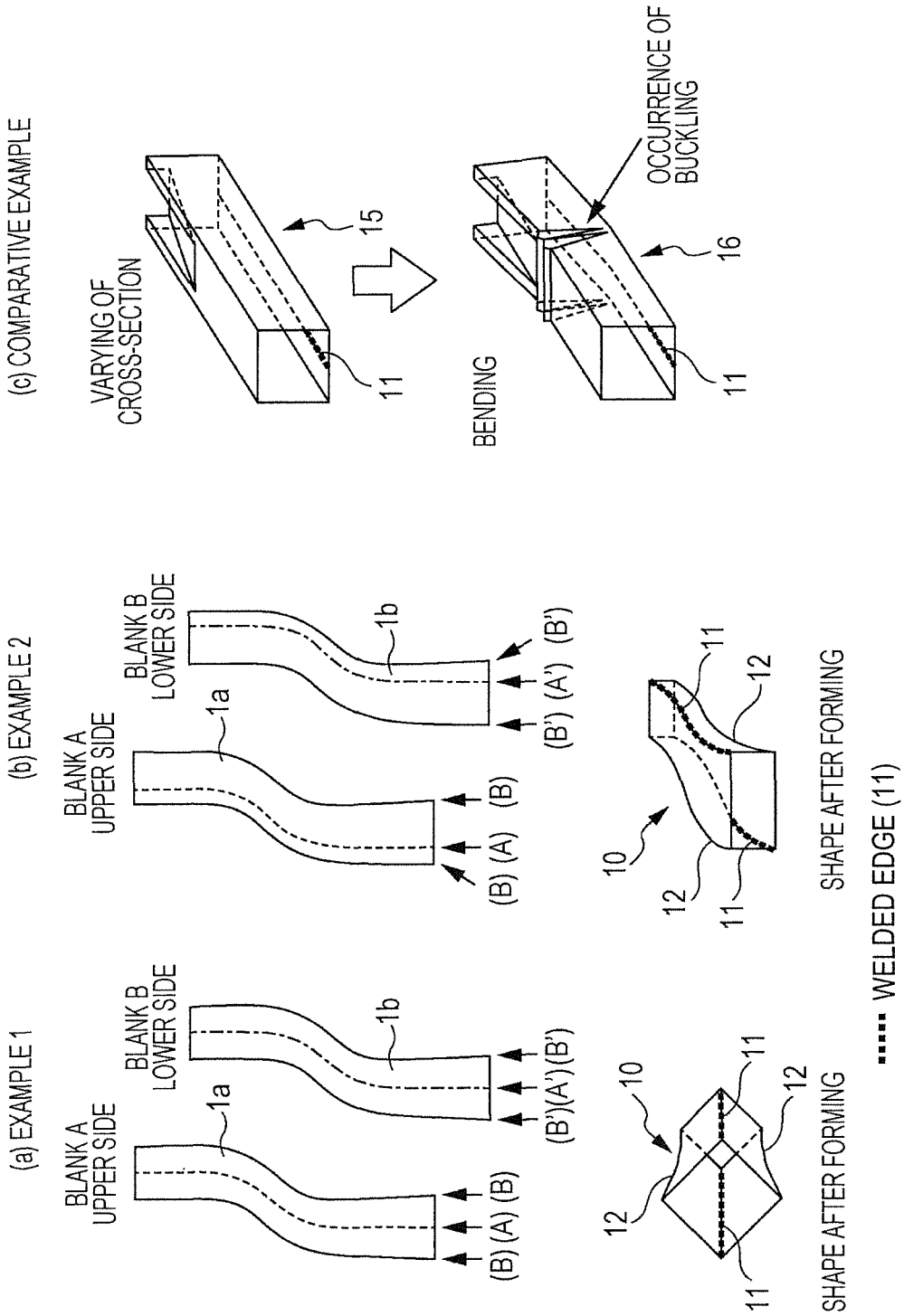
FIG. 3 is a schematic diagram showing manufacturing procedures of a part according to examples and a comparative example.

FIG. 1 is an explanatory diagram of our manufacturing process Manufacturing the part of FIG. 2 will be described by way of an example. The exemplary part shown in FIG. 2 is a part according to structure 1 shown in FIG. 3 (a). In FIG. 3, two metal plates 1a and 1b are provided with bending lines to represent the curvature of the plate in the longitudinal direction thereof that correspond to the curvature of the part in the longitudinal direction thereof. That is, the metal plate 1a and the metal plate 1b are respectively provided with bending lines (B) (B) and bending lines (B') (B') as two bending lines corresponding to the welded edges 11 s of the part 10 at the ends in the width direction. Also, the metal plate 1 a and the metal plate 1b are respectively provided with a bending line (A) and a bending line (A') as bending lines corresponding to the non-welded bent edges 12 on the inner side in the width direction.

First Step

The first step is a step of preforming. Using a press-forming machine 20 having a punch 3 and a die 4, metal plates 1 are press-formed such that folding lines 2 corresponding to non-welded bent edges 12 among four vertices of the quadrant cross-section of the part are formed at the position of the bending line (A) (A') on the inner side in the width direction. The shapes of the punch 3 and the die 4 are designed such that such a folding line 2 is formed. The radius of curvature in the width direction of the plate at the position of the folding line 2 is set so as to be constant over the entire length of the plate.

Second Step

The second step is a step of welding the ends in the width direction. The metal plates 1a and 1b after the above-described preforming are stacked on each other vertically such that their bulging sides (sides that are bulged as a result of forming the folding lines 2 by the bending forming in the first step) face outwardly, and are placed in a welding machine 30. The outer surfaces thereof are held by upper and lower holding jigs 6a and 6b. Bending lines (B) (B') stacked on each other at the left ends in the width direction are mutually welded along the longitudinal direction, and bending lines (B) (B') stacked on each other at the right ends in the width direction are mutually welded along the longitudinal direction to form a welded parts 11. Thus, a closed structure 5 is formed. The welding is preferably performed by laser welding, arc welding, or the like. A known laser welding apparatus or the like can be used as a welding apparatus (not shown).

Third Step

The third step is a step of roll forming. That is, the closed structure 5 obtained in the previous step is passed through a roll forming machine 40. While the roll forming machine 40 is guiding and conveying the closed structure 5 with a pair of left and right rotary rolls 40a and 40b or, in addition thereto, a rotary roll 40c thereunder, the roll forming machine 40 changes the distance between the rotary rolls 40a and 40b or, in addition to doing so, the roll forming machine 40 moves the rotary roll 40c up and down, thereby making the closed structure 5 to have a three-dimensional shape by using the folding lines 2 and the welded edges 11 as origins. Thus, a part 10 having the target shape is formed.

The shapes of the rotary rolls are set to shapes that can guide roll abutment edges of the closed structure, which is a workpiece, stably without a positional deviation or the like. Although each of the rotary rolls 40a, 40b, and 40c in FIG. 1 have a V-shape as an example, this disclosure is not limited to this. The distance between the rotary rolls (corresponding to the pressing forces exerted from the left- and right-sides by the rolls on the closed structure) and the position in the vertical direction of the rotary roll (corresponding to the upward pressing force exerted from the lower-side by the roll on the closed structure) are changed such that the target shape of the part is obtained. The way of changing thereto can be determined in advance by theoretical analysis or experiment. A rotary roll facing to the lower rotary roll may further be installed above the rolls and may be used to form the target shape of the part.

In this example, the target shape of the part is not twisted. To achieve that shape, in FIG. 3 (a), in each of the two metal plates 1, a total of three bending lines: two bending lines at ends in the width direction and one bending line on the inner side in the with direction have the same radius of curvature, and the curvature center points thereof are located on the same straight line. When the target shape of the part is twisted, the twisted target shape can be achieved by making the total of three bending lines to have different radii of curvature and/or by not locating the curvature center points thereof on the same straight line. In a shape other than a quadrangle, the first to third steps can manufacture a closed structure part using a die, rotary rolls, and so forth having shapes corresponding to the shape of the part same as a quadrangular part.

For example, when the object of manufacture is a part having a hexagonal cross-section such as that shown in FIG. 5, the number of non-welded bent edges 12 increases by two compared to a quadrangular cross-section in FIG. 2. Therefore, in accordance with this, as shown in FIG. 6, two bending lines (A) (A') on the inner side in the width direction are set with respect to each of the upper and lower blanks.

Figure 4:
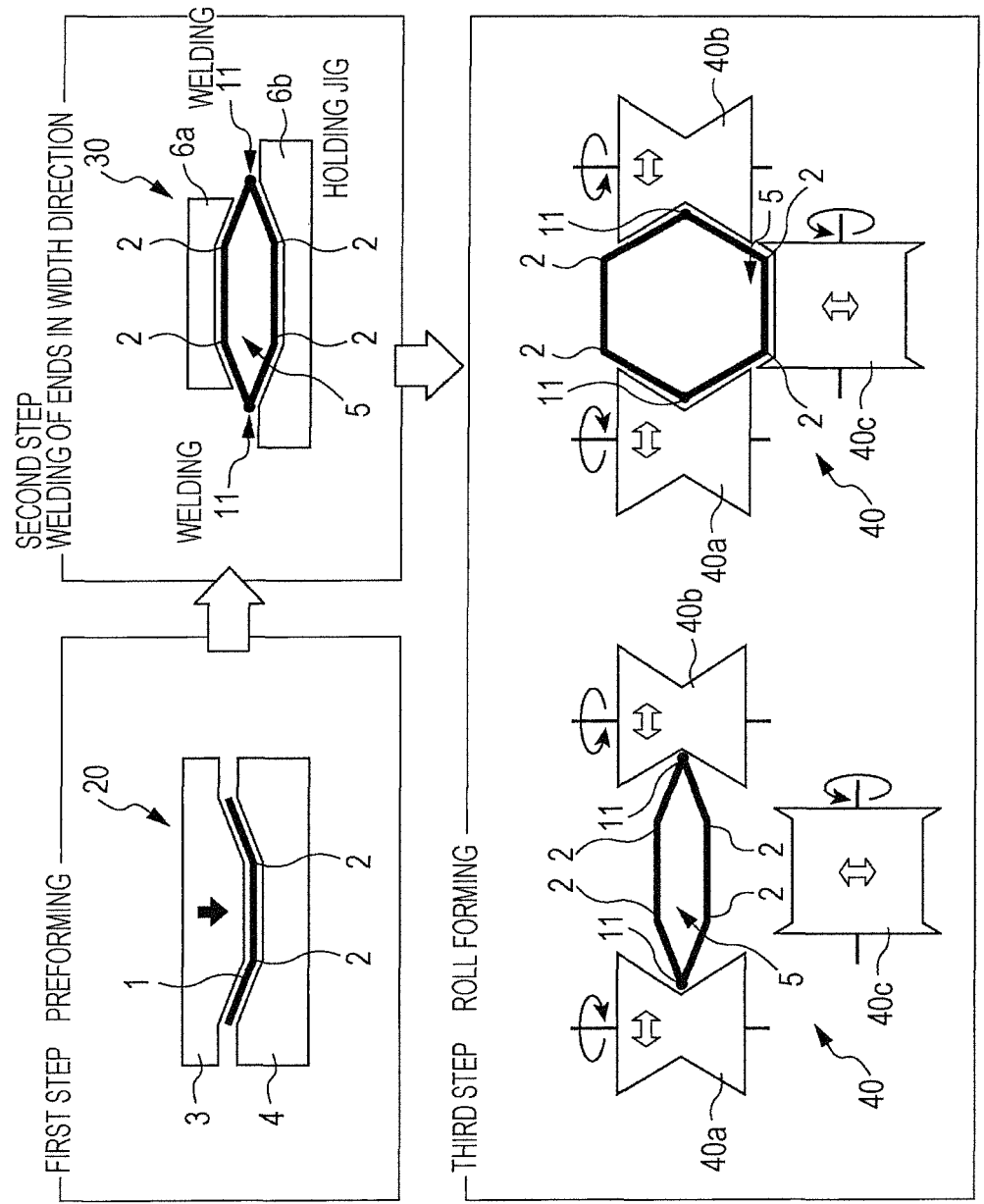
FIG. 4 is an explanatory diagram of a process of manufacturing a part having a hexagonal cross-section.

In response to the change from a quadrangular cross-section to a hexagonal cross-section, a process shown in, for example, FIG. 4, which is obtained by modifying the apparatus members used in FIG. 1 is used as a manufacturing process. That is, dies used in the first step (the step of preforming) have shapes such that folding lines 2 are formed at the positions of bending lines (A) (A') in FIG. 6. In the second step (the step of welding the ends in the width direction), holding jigs 6 have cross-sectional shapes conformed to the shape of the blanks after the preforming. In the third step (the step of roll forming), the role profile of the lower rotary roll 40c has a flat bottom shape capable of stably guiding one side, for example, of a hexagon. This process is the same as that of FIG. 1 except for these changes. By this, the shape after forming shown at the bottom of FIG. 6 can be achieved with a high degree of accuracy and easily.

EXAMPLES

The following are common to the examples.
Part Target Shape

The cross-section is quadrangle (each corner has a right angle) and varies along the longitudinal direction of the part. There are no flanges. The shape has an S-shaped curvature in the longitudinal direction of the part.
Material Metal Plate From a cold-rolled steel sheet having a tensile strength of 1180 MPa (1.4 mm in thickness), two blanks A and B having an S-shaped curvature corresponding to the target shape of the part were cut out.
Welding Conditions Laser welding, laser output 3.8 kW, welding speed 2.5 m/minute, laser focus diameter 2 mm Example 1

As shown in FIG. 3 (a), a blank 1a (blank A) had a bending line (A) that was to be a folding line 2 at a central position between two bending lines (B) (B) at ends in the width direction, and another blank 1b (blank B) had a bending line (A') that was to be a folding line 2 at a central position between two bending lines (B') (B') at ends in the width direction. These two blanks A and B were preformed in the first step as described above, and folding lines 2 along the bending lines (A) (A') were formed. When the blanks A and B were stacked in the second step as described above, the blank A was on the upper side, and the blank B was on the lower side. Edges at bending lines (B) (B') at ends in the width direction that were vertically opposed were laser-welded. The obtained closed structure 5 was roll-formed in the third step as described above, and a part 10 was obtained.

Example 2

As shown in FIG. 3 (b), a blank 1a (blank A) had a bending line (A) that was to be a folding line 2 set at a position to the left of the center between two bending lines (B) (B) at ends in the width direction, and another blank 1b (blank B) had a bending line (A') that was to be a folding line 2 set at a position to the right of the center between two bending lines (B') (B') at ends in the width direction (a position symmetrical to the previously mentioned position to the left of the center). These two blanks A and B were preformed in the first step as described above, and folding lines 2 along the bending lines (A) (A') were formed. When the blanks A and B were stacked in the second step as described above, the blank A was on the upper side, and the blank B was on the lower side. Edges at bending lines (B) (B') at ends in the width direction that were vertically opposed were laser-welded. The obtained closed structure 5 was roll-formed in the third step as described above, and a part 10 was obtained.

Comparative Example

Blanks cut out from the same steel sheet as those of examples into shapes different from those of the examples were used as materials. Forming processing (varying of cross-sectional shape) was performed in a conventional manner by a roll forming such that the forming start position and the forming end position have different cross-sectional shapes, and a flangeless intermediate shaped part 15 shown in FIG. 3 (c) was formed. This was bent by roll forming in the manner of a three-point bending, and a final shaped part 16 was obtained.

It was evaluated whether forming was possible in the examples and the comparative example. As a result, in either example, forming was possible in all of the first to third steps, and the part 10 after the third step achieved the target shape, and there was no place where a forming defect such as breaking, buckling, or wrinkling had occurred. On the other hand, in the comparative example, there was no place where a forming defect had occurred in the intermediate shaped part 15 after the varying of cross-sectional shape, but buckling occurred in the place shown in the figure in the final shaped part 16 after bending.

The invention claimed is:

1. A method of manufacturing a closed structure part having a curvature and welded edges along a longitudinal direction of the part, and having a varying cross-sectional shape, from two metal plates, comprising:
   press forming each of the two metal plates, which are provided with a curvature along a longitudinal direction of each of the metal plates corresponding to the curvature of the part along the longitudinal direction and further provided with both ends in a width direction of each of the metal plates corresponding to the to be welded edges of the part such that a folding line is formed along a longitudinal direction forming a bend along each plate;
   forming a closed structure by stacking the two metal plates on each other vertically after the press forming such that the folding lines form corners that face outwardly and longitudinal edges of the plates contact one another and mutually welding the contacting longitudinal edges along the longitudinal direction so as to form the welded edges; and
   forming the closed structure into the part having a target shape by guiding and conveying the closed structure with a pair of left and right rotary rolls while changing a distance between the left and right rotary rolls such that the closed structure has a three-dimensional shape and a cross-sectional shape having the folding lines and the welded edges as corners.

2. The method according to claim 1, wherein the closed structure does not have a flange.

3. An apparatus that manufactures a closed structure part having a curvature and welded edges along a longitudinal direction of the part and having a varying cross-sectional shape, from two metal plates, comprising:
   a press forming machine that press forms each of the two metal plates, which are provided with a curvature along the longitudinal direction of each of the metal plates corresponding to the curvature of the part along a longitudinal direction and provided with both ends in a width direction of each of the metal plates corresponding to the to be welded edges of the part such that a folding line is formed along a longitudinal direction forming a bend along each plate;
   a welding machine that forms a closed structure by stacking the two metal plates on each other vertically after the press forming such that the folding lines form corners that face outwardly and longitudinal edges of the plates contact one another and mutually welding the contacting longitudinal edges along the longitudinal direction so as to form the welded edges; and
   a roll forming machine that forms the closed structure into the part having a target shape by guiding and conveying the closed structure with a pair of left and right rotary rolls while changing the distance between the left and right rotary rolls such that the closed structure has a three-dimensional shape and a cross-sectional shape having the folding lines and the welded edges as corners.

4. The apparatus according to claim 3, wherein the closed structure does not have a flange.

5. The method according to claim 1, wherein forming the closed structure into the part having a target shape further comprises guiding and conveying the closed structure with a lower rotary roll positioned under the closed shape and moving the lower rotary roll up and down.

6. The apparatus according to claim 3, wherein forming the closed structure into the part having a target shape further comprises guiding and conveying the closed structure with a lower rotary roll positioned under the closed shape and moving the lower rotary roll up and down.

* * * * *